(12) United States Patent
Momotsu et al.

(10) Patent No.: US 7,903,922 B2
(45) Date of Patent: Mar. 8, 2011

(54) OPTICAL CONNECTOR HOLDER AND OPTICAL TERMINATION CABINET, AND METHOD OF OPTICAL FIBER WIRING IN OPTICAL TERMINATION CABINET

(75) Inventors: Norihiro Momotsu, Chiba-ken (JP); Kazuya Ogata, Chiba-ken (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/187,834

(22) Filed: Aug. 7, 2008

(65) Prior Publication Data
US 2010/0034505 A1 Feb. 11, 2010

(51) Int. Cl.
*G02B 6/00* (2006.01)
(52) U.S. Cl. .......................... 385/135; 385/53
(58) Field of Classification Search .................. None
See application file for complete search history.

(56) References Cited

U.S. PATENT DOCUMENTS

| | | | |
|---|---|---|---|
| 5,058,983 A | 10/1991 | Corke et al. | |
| 5,497,444 A | 3/1996 | Wheeler | |
| 6,227,717 B1 | 5/2001 | Ott et al. | |
| 6,256,443 B1 | 7/2001 | Uruno et al. | |
| 6,760,530 B1 | 7/2004 | Mandry | |
| 6,983,095 B2 | 1/2006 | Reagan et al. | |
| 7,200,317 B2 | 4/2007 | Reagan et al. | |
| 7,218,827 B2 | 5/2007 | Vongseng et al. | |
| 7,233,731 B2 | 6/2007 | Solheid et al. | |
| 7,277,620 B2 | 10/2007 | Vongseng et al. | |
| 7,369,741 B2 | 5/2008 | Reagan et al. | |
| 7,407,330 B2 | 8/2008 | Smith et al. | |
| 7,457,503 B2 | 11/2008 | Solheid et al. | |
| 7,471,869 B2 | 12/2008 | Reagan et al. | |
| 7,519,259 B2 | 4/2009 | Smith et al. | |
| 2006/0228086 A1* | 10/2006 | Holmberg et al. | 385/135 |
| 2008/0013910 A1* | 1/2008 | Reagan et al. | 385/135 |
| 2008/0304804 A1* | 12/2008 | Zimmel et al. | 385/139 |
| 2009/0136183 A1* | 5/2009 | Kahle et al. | 385/72 |
| 2009/0232455 A1* | 9/2009 | Nhep | 385/59 |

FOREIGN PATENT DOCUMENTS

| | | |
|---|---|---|
| JP | 2576978 | 12/1899 |
| JP | 11-072656 A | 3/1999 |
| JP | 2001-124934 A | 5/2001 |
| JP | 2007-516453 A | 6/2007 |

* cited by examiner

*Primary Examiner* — Sung H Pak
(74) *Attorney, Agent, or Firm* — Sughrue Mion, PLLC

(57) ABSTRACT

This optical connector holder includes a holder body into which optical connectors are inserted, connector housing recesses are formed on the holder body and caps which fit together with said optical ferrules of said optical connectors that are inserted into said connector housing recess and which cover their connection end faces, wherein said caps separate from said optical ferrules and remain on said holder body side when said optical connectors are withdrawn from said connector housing recesses.

9 Claims, 11 Drawing Sheets

OPTICAL CONNECTOR HOLDER AND OPTICAL TERMINATION CABINET, AND METHOD OF OPTICAL FIBER WIRING IN OPTICAL TERMINATION CABINET

BACKGROUND OF THE INVENTION

1. Field of the Invention

The present invention relates to an optical connector holder which removably holds optical connectors, and an optical termination cabinet which is provided with this optical connector holder, as well as a method of optical fiber wiring in the aforementioned optical termination cabinet.

2. Description of Related Art

With respect to optical termination cabinets, optical fibers with unconnected connectors are prepared in advance due to the line extension accompanying increases in subscribers. Moreover, line connection changeover, as well as line relocation, line removal and the like generate to optical fibers (optical fibers with connectors) whose connector connections are removed. For such reasons, optical termination cabinets are provided with structures which hold optical fibers having unconnected connectors.

To prevent the connection loss of optical connectors, it is important to keep the optical ferrules clean. Consequently, structures designed to prevent the infiltration of dust and the like have been proposed. For example, an optical connector adapter having a dust-proof lid is disclosed in Japanese Unexamined Patent Application, First Publication No. H11-72656. In addition, in Japanese Translation of PCT Application, First Publication No. 2007-516453, a connector holder is disclosed which enables insertion and withdrawal of optical connectors with attachment of a dust cap to the ferrule.

However, with the aforementioned optical connector adapter having a dust-proof lid, the dust-proofing effect has been insufficient due to use in a state where the dust-proof lid is removed. On the other hand, with connector holders enabling use of dust caps, although the dust-proofing effect is high, it is necessary to remove the optical connectors from the connector holders and to further remove the dust caps from the optical connectors when using the optical connectors, resulting in the problem of complex operation.

In light of the aforementioned problems, the object of the present invention is to offer an optical connector holder which obtains a sufficient dust-proofing effect and which is also easy to operate, and an optical termination cabinet which is provided with this optical connector holder, as well as a method of optical fiber wiring in the optical termination cabinet.

SUMMARY OF THE INVENTION

The optical connector holder of the present invention is an optical connector holder which removably holds optical connectors having optical ferrules and housings that accommodates these optical ferrules, and includes a holder body into which said optical connectors are inserted, connector housing recesses which are formed on the holder body, and caps which fit together with said optical ferrules of said optical connectors that are inserted into said connector housing recesses, and which cover their connection end faces, wherein said caps separate from said optical ferrules and remain on said holder body side when said optical connectors are withdrawn from said connector housing recesses.

Said cap may be configured to be provided with a cap body which covers the connection end face of said optical ferrule, and a stopper which contacts said holder body and which blocks movement of said cap body in said withdrawal direction.

Said cap may be configured to be provided with a cap body which covers the connection end face of said optical ferrule, a stopper which contacts said holder body and which blocks movement of said cap body in said withdrawal direction, and an engagement claw which engages with an engagement recess formed in said holder body.

Said cap may be integrally formed with said holder body.

The optical connector holder of the present invention may be configured so that a latch which is an elastic piece provided with a latching claw is formed in said holder body, and said optical connector holder is capable of attachment to an optical termination cabinet by the engagement of said latching claw of said latch with an engagement unit formed in an attachment plate of said optical termination cabinet.

The optical connector holder of the present invention is an optical connector holder which removably holds optical connectors having optical ferrules and housings that accommodate these optical ferrules, and includes a holder body into which said optical connectors are inserted, connector housing recesses which are formed on the holder body, and a dust-proofing member which fits together with said optical ferrules of said optical connectors that are inserted into said connector housing recesses, and which cover their connection end faces, wherein said caps separate from said optical ferrules and remain on said holder body side when said optical connectors are withdrawn from said connector housing recesses.

With respect to the optical termination cabinet of the present invention, in an optical termination cabinet on which is mounted a termination unit in which termination-side optical connectors are arrayed which terminate optical fibers so as to enable connector connection, an optical connector holder is provided which removably holds connection-side optical connectors which are capable of connecting to said termination-side optical connectors; said connection-side optical connectors have optical ferrules, and housings which accommodate these optical ferrules, while said optical connector holder is provided with a holder body into which said connection-side optical connectors are inserted, connector housing recesses which are formed on the holder body and caps which fit said optical ferrules of said connection-side optical connectors that are inserted into said connector housing recesses, and which cover their connection end faces; and said caps separate from said optical ferrules and remain on said holder body side when said connection-side optical connectors are withdrawn from said connector housing recesses.

Said termination unit is provided within a frame, and may be freely withdrawn from and stored in said frame by swinging on the fulcrum of a hinge.

The optical fiber wiring method of the present invention is a method of optical fiber wiring in an optical termination cabinet on which is mounted a termination unit in which termination-side optical connectors are arrayed which terminate optical fibers so as to enable connector connection, wherein: said optical termination cabinet is provided with an optical connector holder which removably holds connection-side optical connectors capable of connecting to said termination-side optical connectors; said connection-side optical connectors have optical ferrules, and housings which accommodate these optical ferrules; said optical connector holder includes a holder body into which said connection-side optical connectors are inserted, connector housing recesses which are formed on the holder body, and caps which fit together with said optical ferrules of said connection-side optical connectors that are inserted into said connector housing recesses and which cover their connection end faces, wherein said caps are formed so as to separate from said optical ferrules and remain on said holder body side when said connection-side optical connectors are withdrawn from said connector housing recesses; and said optical ferrules are withdrawn from said caps by withdrawing said connection-side optical connectors from said connector housing recesses, and the connection-side optical connectors in which the connection end faces of said optical ferrules are exposed are connected to said termination-side optical connectors.

PREFERRED EMBODIMENTS

Below, embodiments of the present invention are described with reference to drawings.

Embodiment 1

Below, the optical connector holder of a first embodiment of the present invention is described with reference to FIG. 1 to FIG. 7.

Figure 1:
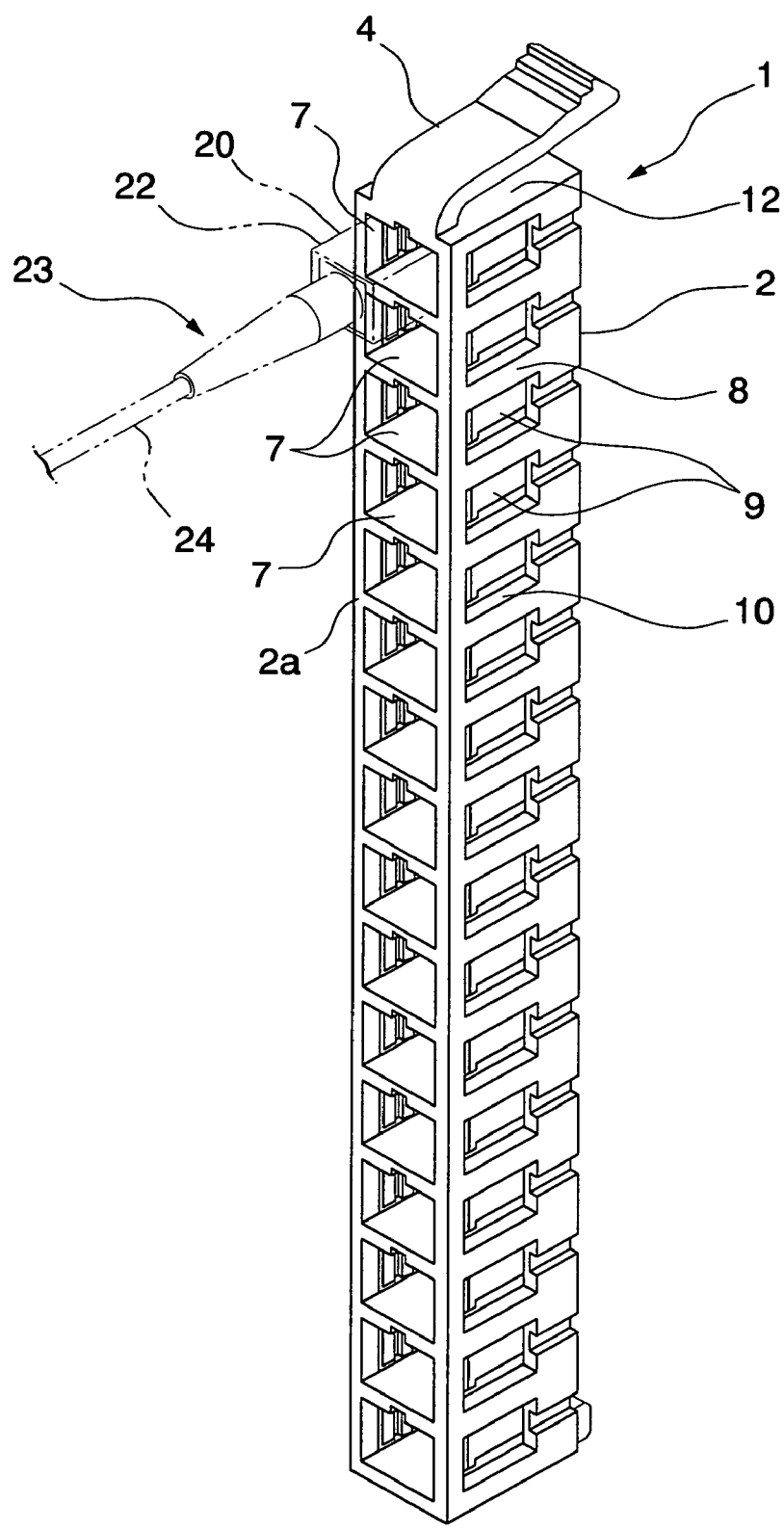
FIG. 1 is an overall perspective view which shows a first embodiment of the optical connector holder pertaining to the present invention.
Figure 2:
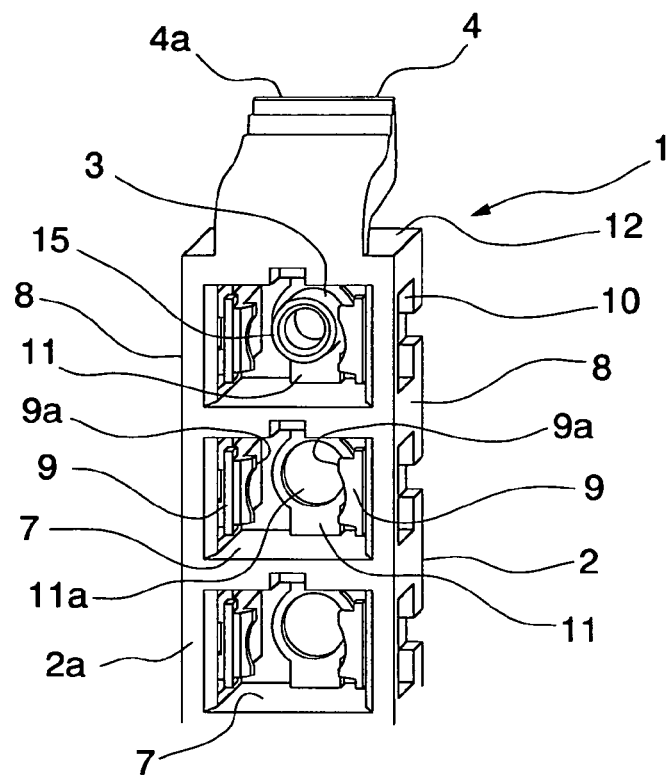
FIG. 2 is a partial perspective view seen from the front side of the optical connector holder shown in FIG. 1.
Figure 3:
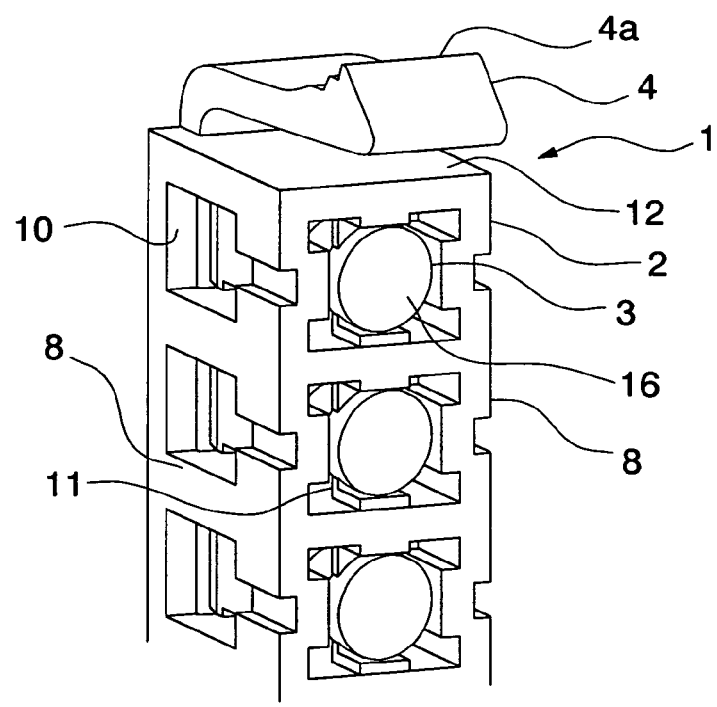
FIG. 3 is a partial perspective view seen from the rear side of the optical connector holder shown in FIG. 1.
Figure 4:
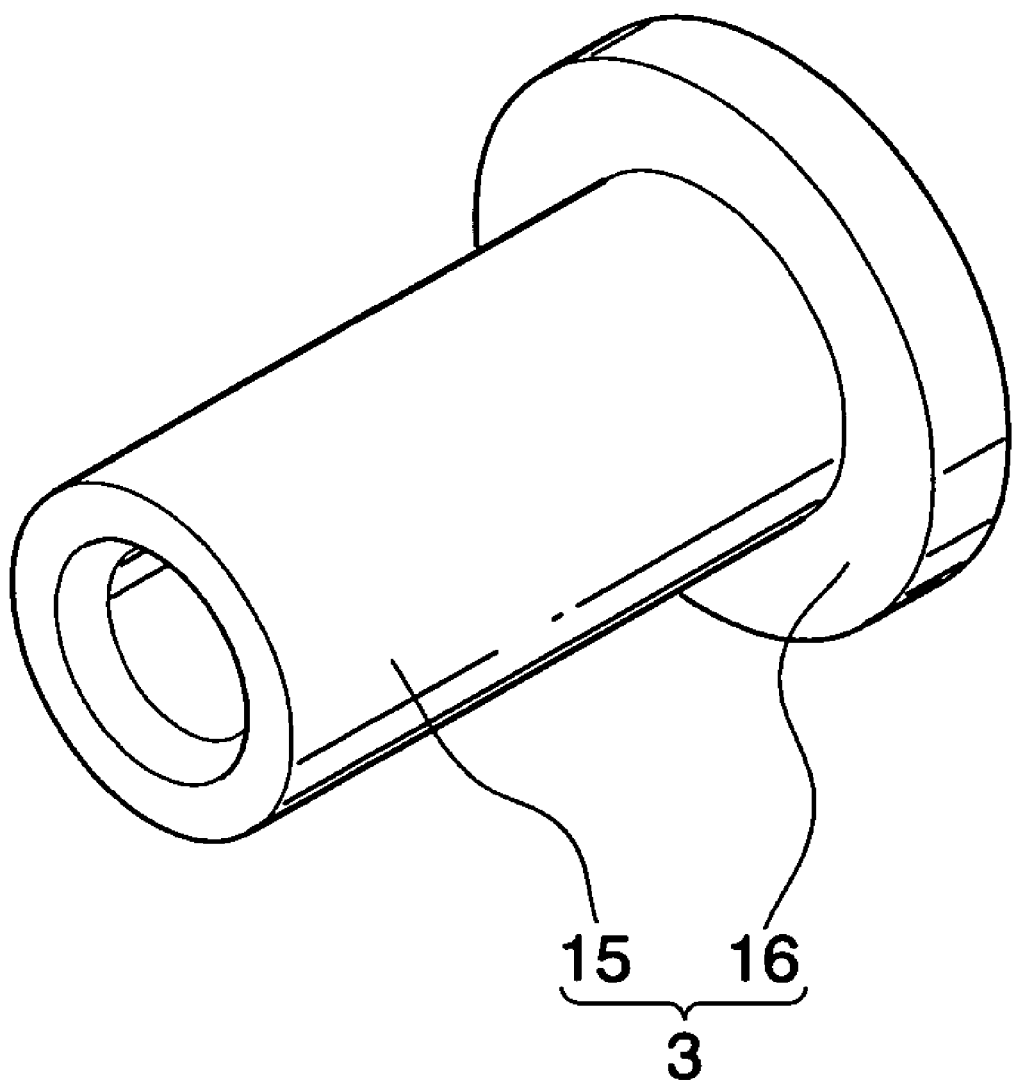
FIG. 4 is a perspective view of the cap of the optical connector holder shown in FIG. 1.
Figure 5:
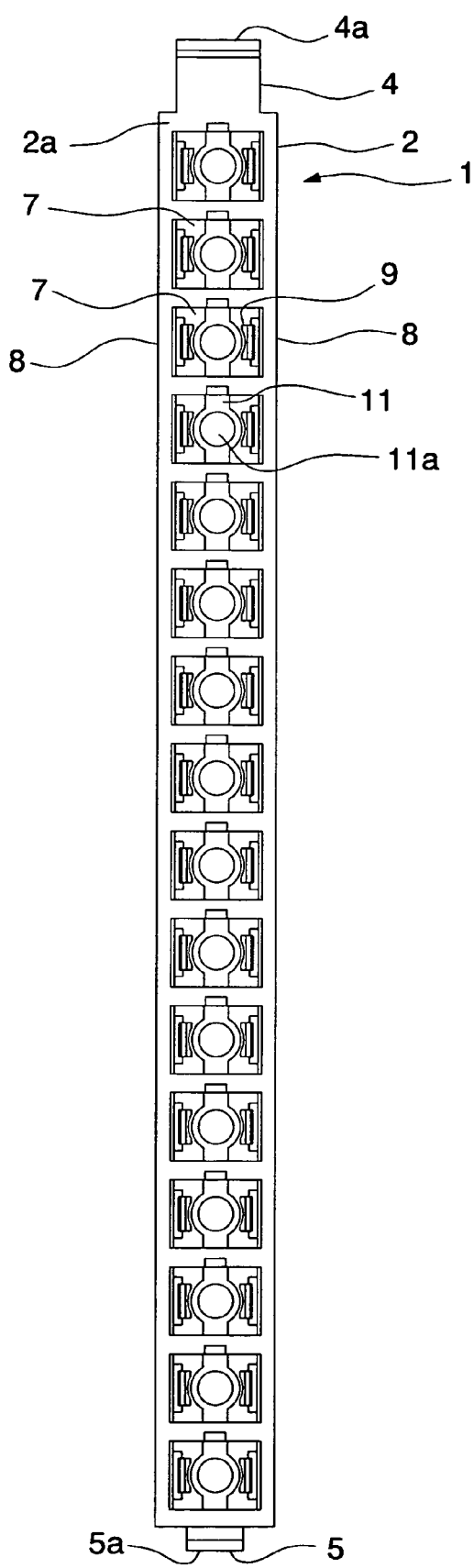
FIG. 5 is a frontal view of the optical connector holder shown in FIG. 1.
Figure 6:
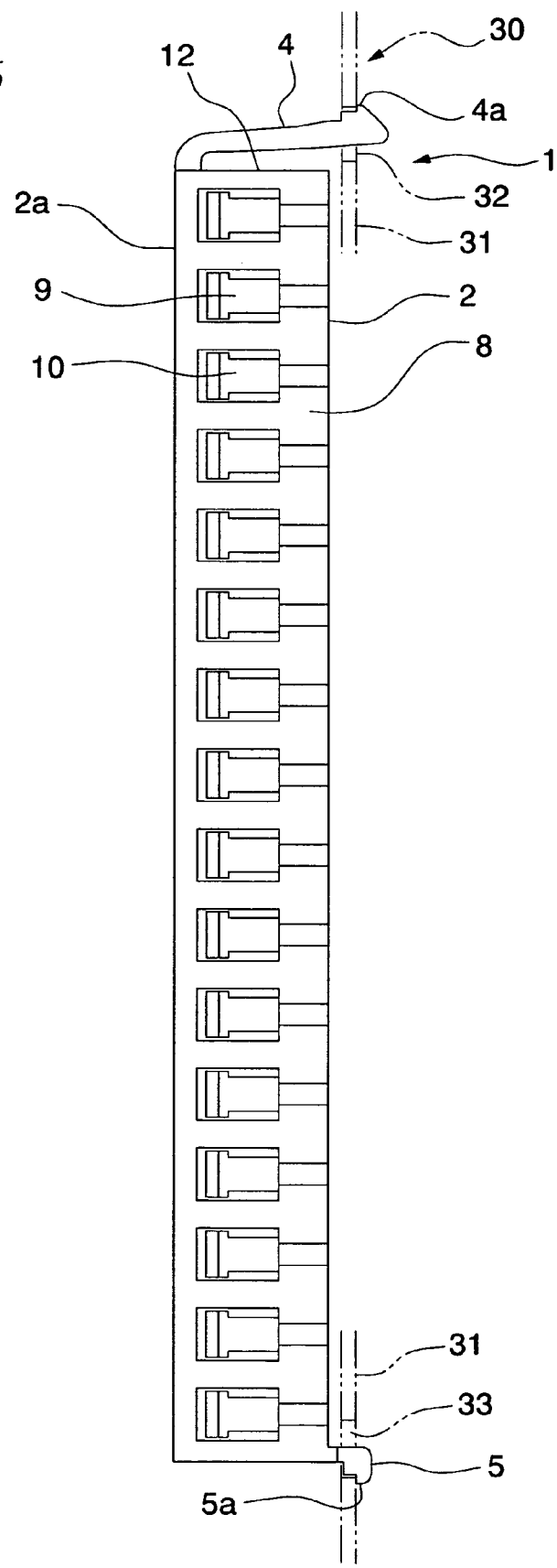
FIG. 6 is a lateral view of the optical connector holder shown in FIG. 1.
Figure 7:
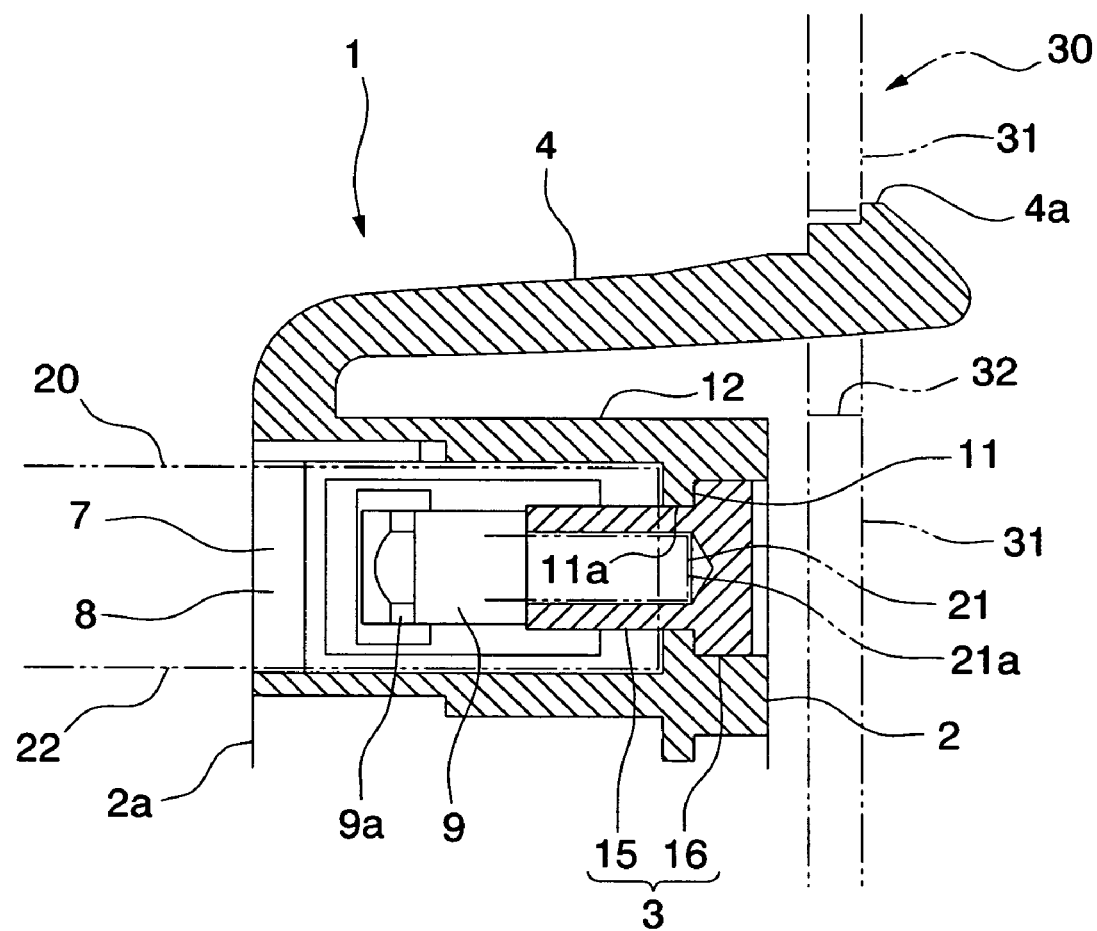
FIG. 7 is a lateral sectional view which shows the essential parts of the optical connector holder shown in FIG. 1.

FIG. 1 is an overall perspective view which shows an optical connector holder 1 of this embodiment; FIG. 2 is a partial oblique view seen from the front side of the optical connector holder 1; FIG. 3 is a partial perspective view seen from the rear side of the optical connector holder 1; FIG. 4 is a perspective view of a cap 3; FIG. 5 is a frontal view of the optical connector holder 1; FIG. 6 is a lateral view of the optical connector holder 1; FIG. 7 is a lateral sectional view which shows the essential parts of the optical connector holder 1.

As shown in FIG. 1 to FIG. 7, the optical connector holder 1 is provided with a holder body 2, and a cap 3 (dust-proofing member) which fits together with an optical ferrule 21 of a connection-side connector 20 (optical connector plug) (hereinafter, referred to as optical connector 20 or optical connector plug 20). The holder body 2 is formed from resin or the like.

As shown in FIG. 1, the holder body 2 is formed in the frame-like shape of a substantially rectangular parallelepiped. On its front plane 2a, multiple connector housing recesses 7 are formed in a row. The insertion direction of the optical connector plug 20 into the connector housing recess 7 is referred to as rearward, while the opposite direction is referred to as forward.

The conventional SC-type optical connector (F04-type single-core optical connector) set forth in JIS C 5973 may be suitably employed in the optical connector 20. Accordingly, the conventional slide-lock system used in this standard is appropriate as the junctional structure of the optical connector plug 20 and holder body 2.

An aperture 10 is formed in each of the lateral plates 8, 8 of the holder body 2 which face each other via the connector housing recess 7.

An engagement recess 22a (see FIG. 11) is formed on both sides of the housing 22 of the optical connector 20. As shown in FIG. 2, an elastic piece 9 having a claw 9a that detachably engages with the engagement recess 22a is formed on the inner faces of the lateral plates 8, 8 of the holder body 2. With respect to the elastic piece 9, its proximal end is integrally formed with the lateral plate 8, creating a forward-extending plate-like shape, which substantially parallels the lateral plate 8. In this manner, as the proximal end of the elastic piece 9 is fixed, and as it is capable of elastic bending deformation in the thickness direction of the lateral plate 8 (the lateral direction in FIG. 2), the claw 9a at the distal end is capable of moving in this direction. Consequently, when the optical connector 20 is inserted into the connector housing recess 7, the claw 9a detachably engages with the engagement recess 22a of the optical connector 20, enabling the optical connector 20 to be interposed and locked.

When the optical connector 20 is withdrawn from the connector housing recess 7, the housing 22 (commonly referred to as a sliding piece) of the optical connector 20 is moved in the withdrawal direction, whereby the claws 9a, 9a are compelled to move away from each other, and the locking state is cancelled. The aforementioned locking structure and locking cancellation mechanism are the system employed in SC-type optical connectors.

A through-hole 11a through which the cap 3 passes is formed in the back plate 11 of the holder body 2. The through-hole 11a is formed to match the external shape of the cap 3, and, for example, may be given a circular shape.

As shown in FIG. 1 and FIG. 5 to FIG. 7, a latch 4 is formed at one end of the holder body 2, and an engagement projection 5 is formed at the other end of the holder body 2.

As shown in FIG. 5 and FIG. 6, the latch 4 is formed on the outer face of the front end of the end plate 12 of the holder body 2, and extends away from the end plate 12 toward the rear. A latch claw 4a is formed on the outer face of the distal end of the latch 4.

As shown in FIG. 6, the latch 4 is made capable of elastic bending deformation toward and away from the end plate 12, and the optical connector holder 1 is attached to an optical termination cabinet 30 by the engagement of the latch claw 4a with an engagement hole 32 (engagement unit) formed in an attachment plate 31 of the optical termination cabinet 30. By causing the latch 4 to undergo bending deformation in the direction which approaches the end plate 12, the latch claw 4a can be released from the engagement hole 32 (engagement unit), and removed from the optical termination cabinet 30.

The engagement projection 5 is formed so as to be capable of engaging with an engagement hole 33 (engagement unit) of the attachment plate 31.

As shown in FIG. 4, the cap 3 is provided with a cap body 15 covering the distal end of the optical ferrule 21, and a stopper 16 formed at the end of the cap body 15. The cap 3 may be an integrated molded product composed of resin or the like.

The cap body 15 serves to prevent adhesions of dust and the like by covering a connection end face 21a of the optical ferrule 21. Its aperture is formed in a lidded cylindrical shape which extends forward to the front, with an inner diameter which is substantially equal or slightly larger than the outer diameter of the optical ferrule 21. When the cap body 15 is configured to contact the outer circumferential face of the optical ferrule 21, the infiltration of dust and the like can be reliably prevented.

The outer diameter of the cap body 15 can be made substantially identical to the inner diameter of the insertion hole 11a.

The stopper 16 blocks movement of the cap body 15 in the withdrawal direction (forward), and prevents this cap 3 from separating from the optical connector holder 2. It is a toroidal projection with a substantially rectangular profile which is formed so as to radially project in the manner of a flange on the outer circumferential face of the rear end of the cap body 15.

The cap 3 in the illustrated example is composed of resin or the like, is formed as a separate object relative to the holder body 2, and is assembled by insertion into the through-hole 11a in post-processing.

As shown in FIG. 7, the cap 3 can adopt the condition where its forward movement is regulated by passing the cap body 15 through the through-hole 11a of the back plate 11, and by having the stopper 16 come into contact with the back plate 11. When the external diameter of the cap body 15 is made substantially identical to the inner diameter of the insertion hole 11a, the cap body 15 can be temporarily held in the holder body 2 by press fitting the cap body 15 in the insertion hole 11.

By forming the stopper 16 so as to contact and fit projections 7a formed on each inner face side (4 places) of the rectangular connector housing recess 7, it can be temporarily held in the holder body 2.

In the present invention, so long as the dust-proofing member fits the optical ferrule and covers its connection end face, and has a structure preventing infiltration of dust or the like, one is not limited to the cylindrically shaped cap illustrated in the drawings. For example, the cap body 15 may be given a conical shape.

Moreover, the stopper may be given a form other than that of a toroidal projection. For example, it is possible to provide multiple projections, which function as a stopper, on the outer circumferential face of the cap body.

It is also possible to fix the holder body 2 to the cap 3 by means of an adhesive agent.

Figure 8:
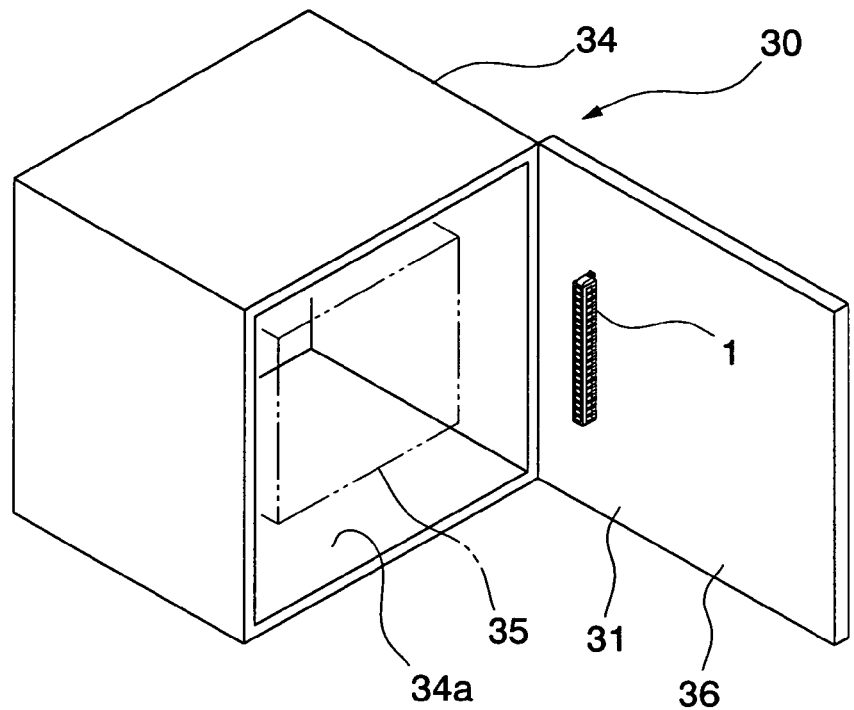
FIG. 8 is a schematic view which shows the skeleton framework of one example of an optical termination cabinet using the optical connector holder shown in FIG. 1.

FIG. 8 shows the optical termination cabinet 30 using the optical connector holder 1. The optical termination cabinet 30 of this example is provided with a frame 34, termination unit 35 (also referred to as termination unit) installed inside the frame 34, and a door 36 which is swingably attached to the frame 34, and which closes the frontal aperture 34a of the frame 34.

With respect to the termination unit 35, multiple optical connector adapters 35a (hereinafter may be referred to as termination-side optical connectors) are arrayed on the front side (work plane side or opening plane side). Optical fibers terminated with optical connectors (not illustrated) are connected to the rear side (the side opposite the work plane; the rear plane side of the termination unit 35) of these optical connector adapters 35a. The interior of the termination unit 35 accommodates a wiring guide mechanism for the optical fibers connected to the optical connector adapters 35a, or optical units such as optical couplers and optical splitters. The optical fibers withdrawn from the termination unit 35 are appropriately wired toward target locations. These optical fibers may, for example, be connected to intra-office devices or the like.

The optical connector holder 1 is installed on the inner face of the door 36. That is, the optical connector holder 1 is attached to the door 36 by having the latch claw 4a of the latch 4 engage with the engagement hole 32 formed in the attachment plate 31 on the inner side of the door 36, and by having a projecting claw 5a of the engagement projection 5 engage with the engagement hole 33 (see FIG. 6).

Figure 9:
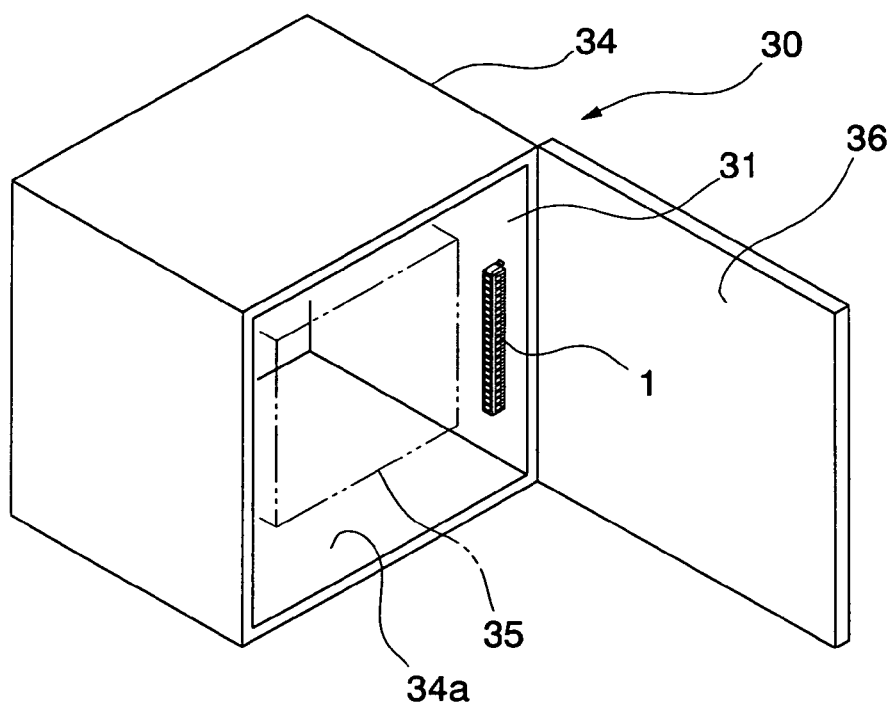
FIG. 9 is a schematic view which shows the skeleton framework of another example of an optical termination cabinet using the optical connector holder shown in FIG. 1.

The attachment position of the optical connector holder 1 is not limited thereto. As shown in FIG. 9, it is also possible to conduct attachment to the attachment plate 31 on the inner side of the frame 34. The attachment structure in this case can be made identical to the attachment structure of the door 36.

Figure 10:
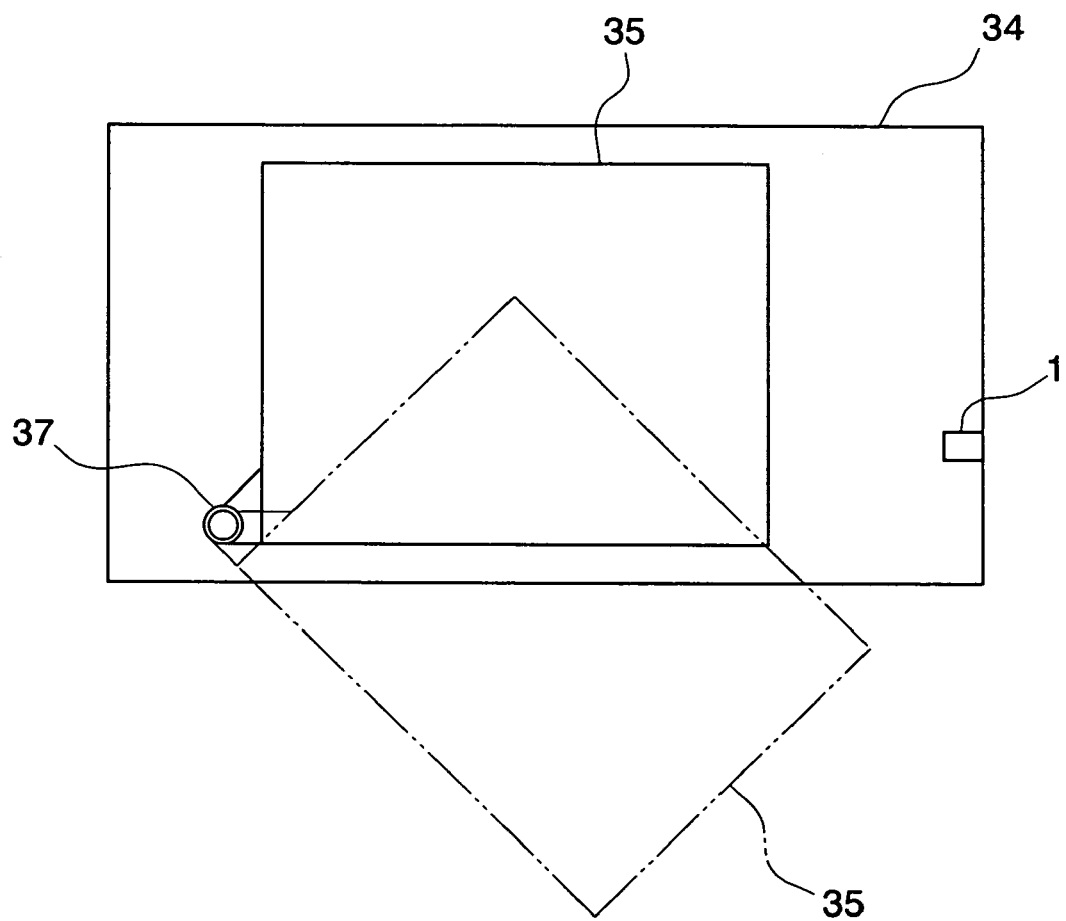
FIG. 10 is a schematic view which shows the skeleton framework of another example of an optical termination cabinet using the optical connector holder shown in FIG. 1.

In the optical termination cabinet 30 shown in FIG. 8 and FIG. 9, the termination unit 35 is fixed to the frame 34, but as shown in FIG. 10, the termination unit 35 may also be configured so as to be freely withdrawn from and stored in the frame 34. The termination unit 35 shown in this drawing is made so as to be freely withdrawn from and stored in the frame 34 by swinging it on the fulcrum of a hinge 37 provided in the frame 34.

As the termination unit 35 is able to swing, the side planes as well as the plane on the opposite side of the work plane where the multiple optical connector adapters 35a are arranged can be disposed within the work space. Consequently, as the advantage arises that the insertion/removal ports of the optical fibers that are withdrawn from the termination unit 35 can be increased, it is possible to raise the degree of freedom of the optical wiring mode of the optical termination cabinet, and enhance the optical fiber packaging density of the optical termination cabinet.

For example, the front plane side of the termination unit 35 can be made the array plane of the optical connector adapters, and the side planes of the termination unit can be used for insertion/removal ports of the optical fibers which are withdrawn from the optical units arranged in the termination unit 35. Moreover, as the plane on the opposite side of the work plane can also be disposed within the work space by imparting a large swing to the termination unit 35, work such as wiring mode change and wiring replacement within the termination unit 35 is facilitated.

An optical termination cabinet provided with the termination unit 35 enabling insertion and removal by such rotation is disclosed, for example, in Japanese Unexamined Patent Application, First Publication No. 2001-124934 (application number: Patent Application H11-307756, filed on Oct. 28, 1999; title of invention: Optical Termination Cabinet, inventors: Motomasa Shindo, et al.).

Next, a description is given of the operations whereby the optical connectors 20 are attached to and removed from the optical connector holder 1.

With respect to optical termination cabinets, due to line extension and the like accompanying increases in subscribers, optical fibers with unconnected connectors may be prepared in advance. The unconnected optical fibers are, for example, optical fibers which are withdrawn from an optical cable on the subscriber side.

With respect to the optical termination cabinet 30, such unconnected optical fibers with connectors 23 can be removably held in the optical connector holder 1. As shown in FIG. 1, the optical fiber with connector 23 assembles the optical connector 20 at the distal end of an optical fiber 24.

As shown in FIG. 7, the optical connector 20 is provided with an optical ferrule 21 and a housing 22 which accommodates the optical ferrule 21.

When the optical connector 20 is inserted into the connector housing recess 7, the claw 9a of the elastic piece 9 engages with the engagement recess 22a of the housing 22 (see FIG. 11), and the optical connector 20 is held.

At this time, the distal end including the connection end face 21 a of the optical ferrule 21 is covered, because the optical ferrule 21 inserts into and fits together with the cap body 15 of the cap 3.

As previously mentioned, when the cap 3 is either temporarily held with sufficient force or is fixed by an adhesive agent in the holder body 2, detachment of the cap 3 due to insertion of the optical ferrule 21 is inhibited.

In the case where the necessity of lineextension arises in conjunction with an increase in subscribers, the required number of optical fibers with connectors 23 are removed from the optical connector holder 1.

When an optical connector 20 is removed from the optical connector holder 1, the optical connector 20 is moved in the withdrawal direction (leftward in FIG. 7), and is withdrawn from the connector housing recess 7. At this time, force is imparted in the withdrawal direction to the cap 3 in conjunction with the movement of the optical ferrule 21, but movement of the cap 3 is blocked by the contact of the stopper 16 with the back plate 11. Consequently, the cap 3 remains on the holder body 2 side, the optical ferrule 21 is withdrawn from the cap 3, and the connection end face 21a becomes exposed.

The optical connector 20 of the optical fiber with connector 23 removed from the optical connector holder 1 can be connected as is to the target termination-side optical connector 35a of the termination unit 35.

According to the optical connector holder 1, as the optical ferrule 21 is provided with a fitted cap 3, it is possible to prevent adhesions of dust and the like to the optical ferrule 21, and to keep the connection end face 21a clean.

Moreover, as the cap 3 is removed from the optical ferrule 21 when the optical connector 20 is withdrawn from the connector housing recess 7, there is no need for operations to remove the cap 3 after withdrawal of the optical connector 20. As a result, it is possible to facilitate operations when connecting the optical connector 20 to the termination unit 35, and to raise operational efficiency.

As there is no need for operations to remove the cap 3, it is possible to prevent occurrence of the situation where the optical ferrule 21 is mistakenly touched during removal, and the connection end face 21a is contaminated. Moreover, as the cap 3 remains in the holder body 2, there is no need to be concerned about loss, and management of the caps 3 is unnecessary.

Second Embodiment

Next, an optical connector holder 41 of a second embodiment of the present invention is described with reference to FIG. 11 and FIG. 12. In the below description, identical code numbers are applied with respect to the previously described components, and description thereof is omitted.

Figure 11:
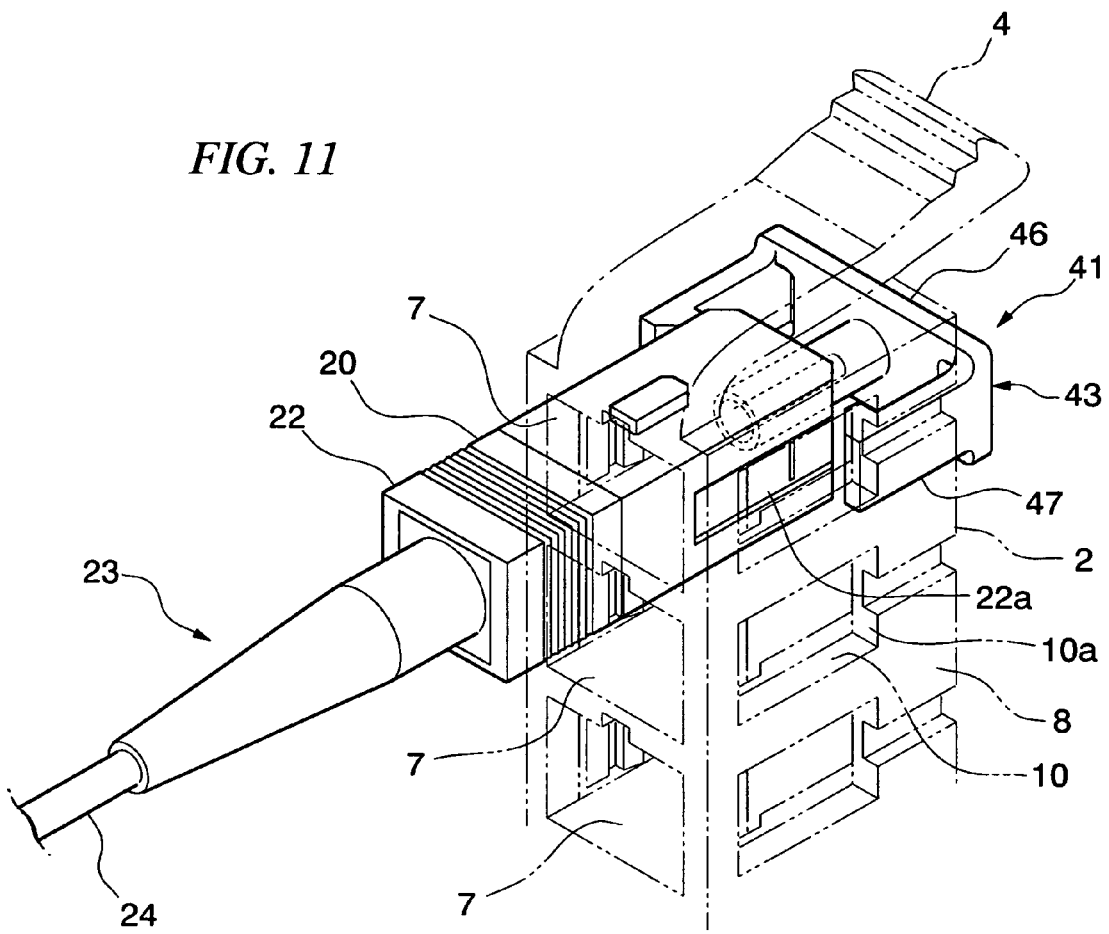
FIG. 11 is a partial perspective view which shows a second embodiment of the optical connector holder pertaining to the present invention.
Figure 12:
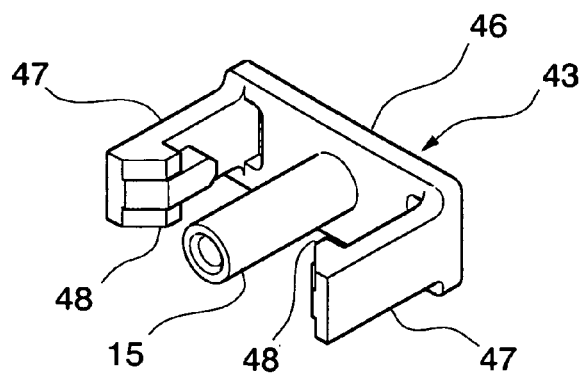
FIG. 12 is a perspective view of the cap used in the optical connector holder shown in FIG. 11.

FIG. 11 is an overall perspective view which shows the optical connector holder 41 of this embodiment, and FIG. 12 is a perspective view which shows a cap 43.

The optical connector holder 41 differs from the optical connector holder 1 shown in FIG. 1 to FIG. 7 in that the cap 43 is used instead of the cap 3.

The cap 43 is provided with the cap body 15, a plate-like stopper 46 which blocks movement of the cap body 15 in the withdrawal direction, plate-like extending pieces 47, 47 which extend substantially vertically relative to the stopper 46 in the same direction as the cap body 15, and an engagement claw 48 formed at the distal end of the extending piece 47.

The engagement claw 48 is formed on the inner face of the extending piece 47 so as to extend inwardly, and is capable of engaging with a rear edge 10a of the aperture 10 of the holder body 2. The engagement claw 48 has an inclined unit 48a which is inclined so that its projection dimensions increase from the distal end side toward the proximal end side of the extending piece 47 on the inner side.

The cap 43 can be attached to the holder body 2 from the back side (rear side). In this attachment process, the cap 43 is pressed and moved forward, whereby the inclined unit 48a of the engagement claw 48 contacts the holder body 2, and the extending pieces 47, 47 are elastically deformed in mutually separating directions by the inclined unit 48a. When the cap 43 is moved further, the engagement claw 48 enters into the aperture 10 due to the elasticity of the extending pieces 47, 47, and engages. Backward movement of the engagement claw 48 is regulated by the contact of its rear face 48b with the rear edge 10a of the aperture 10. Consequently, the cap 43 is attached to the holder body 2 so that the pair of extending pieces 47 sandwich the holder body 2.

In the optical connector holder 41, the aperture 10 functions as an engagement recess which is engaged by the engagement claw 48.

The cap 43 of the illustrated example is composed of resin or the like, and is a separate object relative to the holder body 2.

When the optical connector 20 is withdrawn from the connector housing recess 7, force is imparted to the cap 43 in the withdrawal direction in conjunction with the movement of the optical ferrule 21, but movement is blocked by the contact of the stopper 46 with the back plate 11, with the result that the optical ferrule 21 is withdrawn from the cap 43.

Like the optical connector holder 1 of the first embodiment, the optical connector holder 41 is provided with a cap 43 which fits together with the optical ferrule 21, thereby making it possible to prevent adhesions of dust and the like to the optical ferrule 21 and to keep the connection end face 21a clean.

Moreover, as the optical ferrule 21 is removed from the cap 43 when the optical connector 20 is withdrawn from the connector housing recess 7, it is possible to facilitate operations when connecting the optical connector 20 to the termination unit 35, and to prevent contamination of the optical ferrule 21. As the cap 43 remains in the holder body 2, there is no need to be concerned about loss.

Embodiment 3

Figure 13:
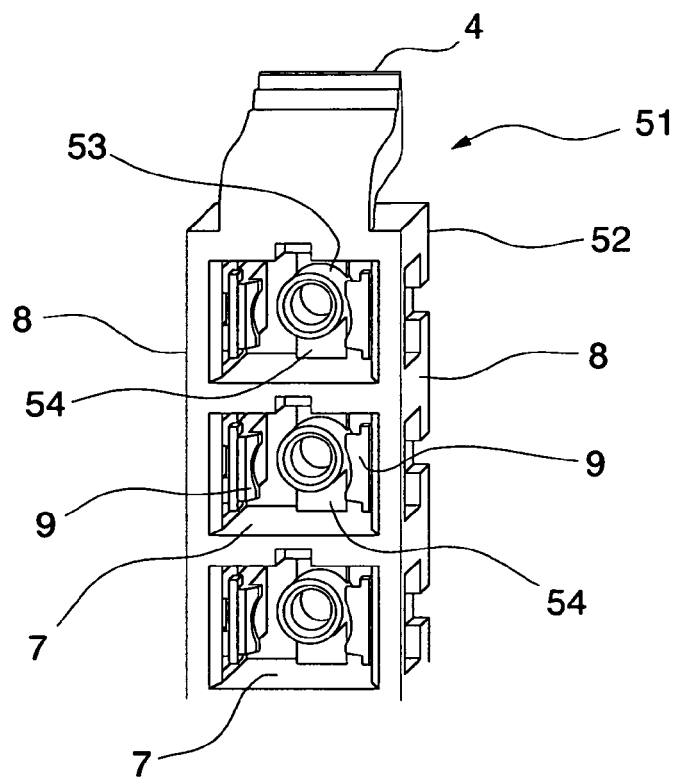
FIG. 13 is a partial perspective view which shows a third embodiment of the optical connector holder pertaining to the present invention.
Figure 14:
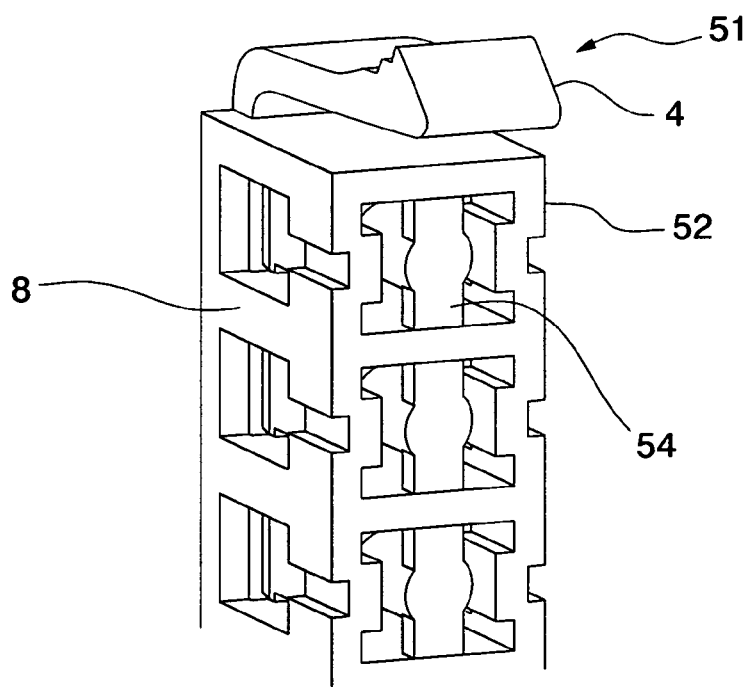
FIG. 14 is a partial perspective view seen from the rear side of the optical connector holder shown in FIG. 13.
Figure 15:
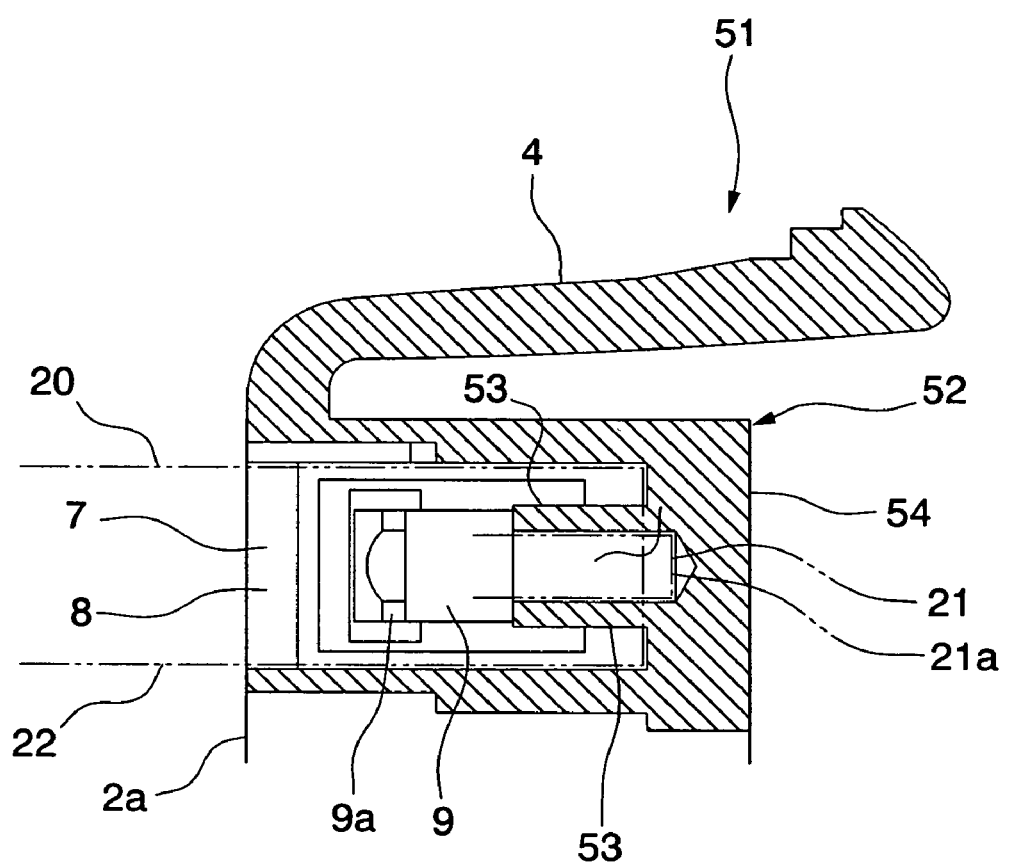
FIG. 15 is a lateral sectional view which shows the essential parts of the optical connector holder shown in FIG. 13.

Next, an optical connector holder 51 of a third embodiment of the present invention is described with reference to FIG. 13 to FIG. 15. FIG. 13 is a partial perspective view seen from the front side of the optical connector holder 51. FIG. 14 is a partial perspective view seen from the rear side of the optical connector holder 51. FIG. 15 is a lateral sectional view which shows the essential parts of the optical connector holder 51.

The optical connector holder 51 is provided with a holder body 52, and a cap 53 which fits the optical ferrule 21 of the optical connector 20.

The cap 53 is formed in a cylindrical shape which has an inner diameter substantially equal to or slightly larger than the external diameter of the optical ferrule 21, and is formed so that its aperture extends forward toward the front on the front plane of the back plate 54 of the holder body 52.

The cap 53 is composed of resin or the like, and is integrally formed with the back plate 54. It is possible to integrally mold the entirety of the optical connector holder 51.

When the optical connector 20 is withdrawn from the connector housing recess 7, force is imparted to the cap 53 in the withdrawal direction in conjunction with movement of the optical ferrule 21, but as the cap 53 is integrally formed with the back plate 54, the optical ferrule 21 is withdrawn from the cap 53.

Like the optical connector holder 1 of the first embodiment, the optical connector holder 51 is provided with a cap 53 which fits together with the optical ferrule 21, thereby making it possible to prevent adhesions of dust and the like to the optical ferrule 21 and to keep the connection end face 21a clean.

Moreover, as the optical ferrule 21 is removed from the cap 53 when the optical connector 20 is withdrawn from the connector housing recess 7, it is possible to facilitate operations when connecting the optical connector 20 to the termination unit 35, and to prevent contamination of the optical ferrule 21.

Otherwise, the SC-type optical connector prescribed in JIS C 5973 was exemplified as the optical connector (optical connector 20, 35a, etc.) employed in the present invention, but as the present invention may be applied to optical connectors of other formats, it is not limited to these working examples.

(Optical Fiber Wiring Method)

The present invention offers an optical fiber wiring method in an optical termination cabinet on which is mounted a termination unit in which termination-side optical connectors are arrayed which terminate optical fibers so as to enable connector connection.

As stated above, the aforementioned optical termination cabinet which uses this optical fiber wiring method is provided with an optical connector holder which removably holds connection-side optical connectors capable of connecting to the aforementioned termination-side optical connectors; the aforementioned connection-side optical connectors have an optical ferrule and a housing which accommodates this optical ferrule; and the aforementioned optical connector holder is provided with a holder body in which connector housing recesses are formed into which the aforementioned connection-side optical connectors are inserted, and caps which fit together with the aforementioned optical ferrules of the aforementioned connection-side optical connectors which are inserted into the aforementioned connector housing recesses.

The aforementioned caps are formed so as to separate from the aforementioned optical ferrules and remain on the aforementioned holder body side when the aforementioned connection-side optical connectors are withdrawn from the aforementioned connector housing recesses.

In the foregoing configuration, an optical fiber wiring method is offered wherein the aforementioned optical ferrules are withdrawn from the aforementioned caps by withdrawing the aforementioned connection-side optical connectors from the aforementioned connector housing recesses, and the connection-side optical connectors in which the connection end faces of the aforementioned optical ferrules are exposed are connected to the aforementioned termination-side optical connectors.

While preferred embodiments of the present invention have been described and illustrated above, it should be understood that additions, omissions, substitutions, and other modifications may be made with respect to its configuration without departing from the spirit or scope of the present invention. Accordingly, the invention is not to be considered as being limited by the foregoing description, and is only limited by the scope of the appended claims.

The invention claimed:

1. An optical connector holder which removably holds optical connectors having optical ferrules and housings that accommodate these optical ferrules, comprising:
   a holder body having a plurality of connector housing recesses into which the optical connectors are inserted; and
   caps which respectively cover a connection end face of the optical ferrules and respectively contact an outer circumferential face of the optical ferrules when the optical connectors are inserted into the connector housing recesses, wherein:
   the caps separate from the optical ferrules and remain on the holder body side when the optical connectors are withdrawn from the connector housing recesses.

2. The optical connector holder according to claim 1, wherein the cap comprises a cap body which covers the connection end face of the optical ferrule, and a stopper which contacts the holder body and blocks movement of the cap towards the withdrawal direction.

3. The optical connector holder according to claim 1, wherein the cap comprises a cap body which covers the connection end face of the optical ferrule, a stopper which contacts the holder body and which blocks movement of the cap towards the withdrawal direction, and an engagement claw which engages with an engagement recess formed in the holder body.

4. The optical connector holder according to claim 1, wherein the cap is integrally formed with the holder body.

5. The optical connector holder according to claim 1, wherein a latch which is an elastic piece provided with a latching claw is formed in the holder body, and the optical connector holder is capable of attachment to an optical termination cabinet by the engagement of the latching claw of the latch with an engagement unit formed in an attachment plate of the optical termination cabinet.

6. An optical connector holder which removably holds optical connectors having optical ferrules and housings that accommodate these optical ferrules, comprising:
   a holder body having a plurality of connector housing recesses into which the optical connectors are inserted; and
   dust-proofing members which respectively cover a connection end face of the optical ferrules and respectively contact an outer circumferential face of the optical ferrules when the optical connectors are inserted into the connector housing recesses, wherein:
   the dust-proofing members separate from the optical ferrules and remain on the holder body side when the optical connectors are withdrawn from the connector housing recesses.

7. An optical termination cabinet comprising:
a termination unit having an optical connector holder which removably holds optical connectors having optical ferrules that respectively fix an optical fiber to a terminal, and housings that accommodate these optical ferrules, the optical connector holder comprising;
a holder body having a plurality of connector housing recesses into which the optical connectors are inserted; and
caps which respectively cover a connection end face of the optical ferrules and respectively contact an outer circumferential face of the optical ferrules when the optical connectors are inserted into the connector housing recesses, wherein;
the caps separate from the optical ferrules and remain on the holder body side when the optical connectors are withdrawn from the connector housing recesses.

8. The optical termination cabinet according to claim 7, wherein the termination unit is provided within a frame, and can be freely withdrawn from and stored in the frame by swinging on the fulcrum of a hinge.

9. A method of optical fiber wiring in an optical termination cabinet, the optical termination cabinet comprising;
a termination unit having an optical connector holder which removably holds optical connectors having optical ferules that respectively fix an optical fiber to a terminal, and housings that accommodate these optical ferrules, the optical connector holder comprising;
a holder body having a plurality of connector housing recesses into which the optical connectors are inserted, and
caps which respectively cover a connection end face of the optical ferrules and respectively contact an outer circumferential face of the optical ferrules when the optical connectors are inserted into the connector housing recess, wherein
the caps separate from the optical ferrules and remain on the holder body side when the optical connectors are withdrawn from the connector housing recesses; and
the optical ferrules are withdrawn from the caps by withdrawing the optical connectors from the connector housing recesses, and the caps respectively cover the connection end face of the optical ferrules and respectively contact the outer circumferential face of the optical ferrules by inserting the optical connectors to the connector housing recesses.

\* \* \* \* \*